(12) United States Patent
Varote et al.

(10) Patent No.: US 11,578,662 B2
(45) Date of Patent: Feb. 14, 2023

(54) AIR TURBINE STARTER WITH LUBRICATED BEARING ASSEMBLY

(71) Applicant: Unison Industries, LLC, Jacksonville, FL (US)

(72) Inventors: Nilesh Vilas Varote, Bangalore (IN); David Raju Yamarthi, Bangalore (IN); David Allan Dranschak, Union, OH (US); Eliel Fresco Rodriguez, Springboro, OH (US); Amit Arvind Kurvinkop, Bangalore (IN)

(73) Assignee: Unison Industries, LLC, Jacksonville, FL (US)

( * ) Notice: Subject to any disclaimer, the term of this patent is extended or adjusted under 35 U.S.C. 154(b) by 0 days.

(21) Appl. No.: 17/517,804

(22) Filed: Nov. 3, 2021

(65) Prior Publication Data

US 2022/0056850 A1    Feb. 24, 2022

Related U.S. Application Data

(63) Continuation of application No. 16/746,267, filed on Jan. 17, 2020, now Pat. No. 11,203,980.

(51) Int. Cl.
| | |
|---|---|
| *F02C 7/275* | (2006.01) |
| *F01D 25/18* | (2006.01) |
| *F02C 7/06* | (2006.01) |
| *F02C 7/36* | (2006.01) |

(52) U.S. Cl.
CPC ............ *F02C 7/275* (2013.01); *F01D 25/186* (2013.01); *F02C 7/06* (2013.01); *F02C 7/36* (2013.01); *F05D 2260/85* (2013.01); *F05D 2260/98* (2013.01)

(58) Field of Classification Search
CPC .......... F02C 7/268; F02C 7/275; F02C 7/277; F02C 7/06; F01D 25/186; F05D 2260/85; F05D 2260/98
See application file for complete search history.

(56) References Cited

U.S. PATENT DOCUMENTS

| | | |
|---|---|---|
| 2,615,533 A | 10/1952 | Cliborn |
| 5,042,963 A | 8/1991 | Sorenson et al. |
| 6,318,958 B1 | 11/2001 | Giesler et al. |
| 6,991,425 B2 | 1/2006 | Kruegel et al. |
| 8,985,857 B2 | 3/2015 | Schmidt et al. |
| 9,845,734 B2 | 12/2017 | Zeiner et al. |
| 9,988,183 B2 | 6/2018 | Ikeguchi et al. |
| 9,988,938 B2 | 6/2018 | Beier et al. |
| 10,234,018 B2 | 3/2019 | Hasting et al. |
| 2004/0234369 A1 | 11/2004 | Feest |
| 2010/0027926 A1 | 2/2010 | Fang et al. |

(Continued)

FOREIGN PATENT DOCUMENTS

| | | |
|---|---|---|
| CA | 2494328 A1 | 6/1993 |
| JP | S5039643 U | 4/1975 |
| WO | 2016021486 A1 | 2/2016 |

*Primary Examiner* — Steven M Sutherland
(74) *Attorney, Agent, or Firm* — McGarry Bair PC

(57) ABSTRACT

An air starter for starting a turbine engine that includes a housing, a turbine member, a drive shaft, and at least one bearing assembly. The housing can define an interior where the turbine couples to the drive shaft that is rotatably supported by the least one bearing assembly. A lubricant passageway can provide lubrication to the at least one bearing assembly.

20 Claims, 8 Drawing Sheets

(56) References Cited

U.S. PATENT DOCUMENTS

| | | | |
|---|---|---|---|
| 2016/0097330 A1* | 4/2016 | Venter | F02C 3/04 |
| | | | 415/122.1 |
| 2019/0032514 A1 | 1/2019 | Gedin et al. | |
| 2019/0145276 A1 | 5/2019 | MacFarlane | |
| 2019/0170240 A1 | 6/2019 | Charrier et al. | |

* cited by examiner

AIR TURBINE STARTER WITH LUBRICATED BEARING ASSEMBLY

CROSS-REFERENCE TO RELATED APPLICATIONS

This application is a continuation of and claims priority to U.S. application Ser. No. 16/746,267, filed Jan. 17, 2020, now issued as U.S. Pat. No. 11,203,980, issued Dec. 21, 2021, the contents of which are incorporated herein by reference.

TECHNICAL FIELD

The disclosure generally relates to a lubricated bearing assembly for an air turbine starter, specifically a lubricated bearing assembly with at least one member that directs lubricant.

BACKGROUND

A turbine engine, for example a gas turbine engine, is engaged in regular operation to an air turbine starter. Air turbine starters are typically mounted to the engine through a gearbox or other transmission assembly. The transmission transfers power from the starter to the engine to assist in starting the engine. The internal components of both the turbine engine and the air turbine starter spin together such that the air turbine starter can be used to start the engine. Due to the rotational speed during start-up, the temperature of internal rotating components of the air turbine starter can decrease the life and efficiency of the air turbine starter.

BRIEF DESCRIPTION

Aspects and advantages of the invention will be set forth in part in the following description, or may be obvious from the description, or may be learned through practice of the invention.

In one aspect, the present disclosure generally relates to an air turbine starter that includes a housing, a turbine member, a drive shaft, a stationary member, a first bearing assembly, a lubricated passageway, and a gear. The housing defines an exterior, an interior, an inlet, an outlet, and a flow path extending through the interior between the inlet and the outlet. The turbine member includes a rotor portion journaled within the interior of the housing and is disposed within the flow path. The drive shaft operably couples with the turbine member. The stationary member has a body forming a bearing cavity. The first bearing assembly is configured to rotatably support the drive shaft or turbine member. The lubricant passageway traverses from an exterior of the body of the stationary structure to the bearing cavity, and the gear is located adjacent an outlet of the lubricant passageway and operably coupled to the turbine member for rotation therewith, the gear configured to direct lubricant towards the first bearing assembly.

In another aspect, the present disclosure generally relates to an air turbine starter, including a housing, a turbine member, a drive shaft, a hollow stationary structure, and a first bearing member. The housing defines an interior. The turbine member has a rotor portion journaled within the interior of the housing. The drive shaft operably couples with the turbine member. The hollow stationary structure is located within the housing and has a body defining a bearing cavity. A passage extends through at least a portion of the hollow stationary structure, the passage having an inlet for splash oil in at least an upper portion of the hollow stationary structure and a basin defined at a lower portion of the hollow stationary structure. The basin is fluidly coupled to the bearing cavity. The first bearing assembly is located within the bearing cavity, the first bearing assembly configured to rotatably support the drive shaft, and at least one member is located within the bearing cavity and configured to direct lubricant in the basin towards the first bearing assembly.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which.

DETAILED DESCRIPTION

Figure 1:
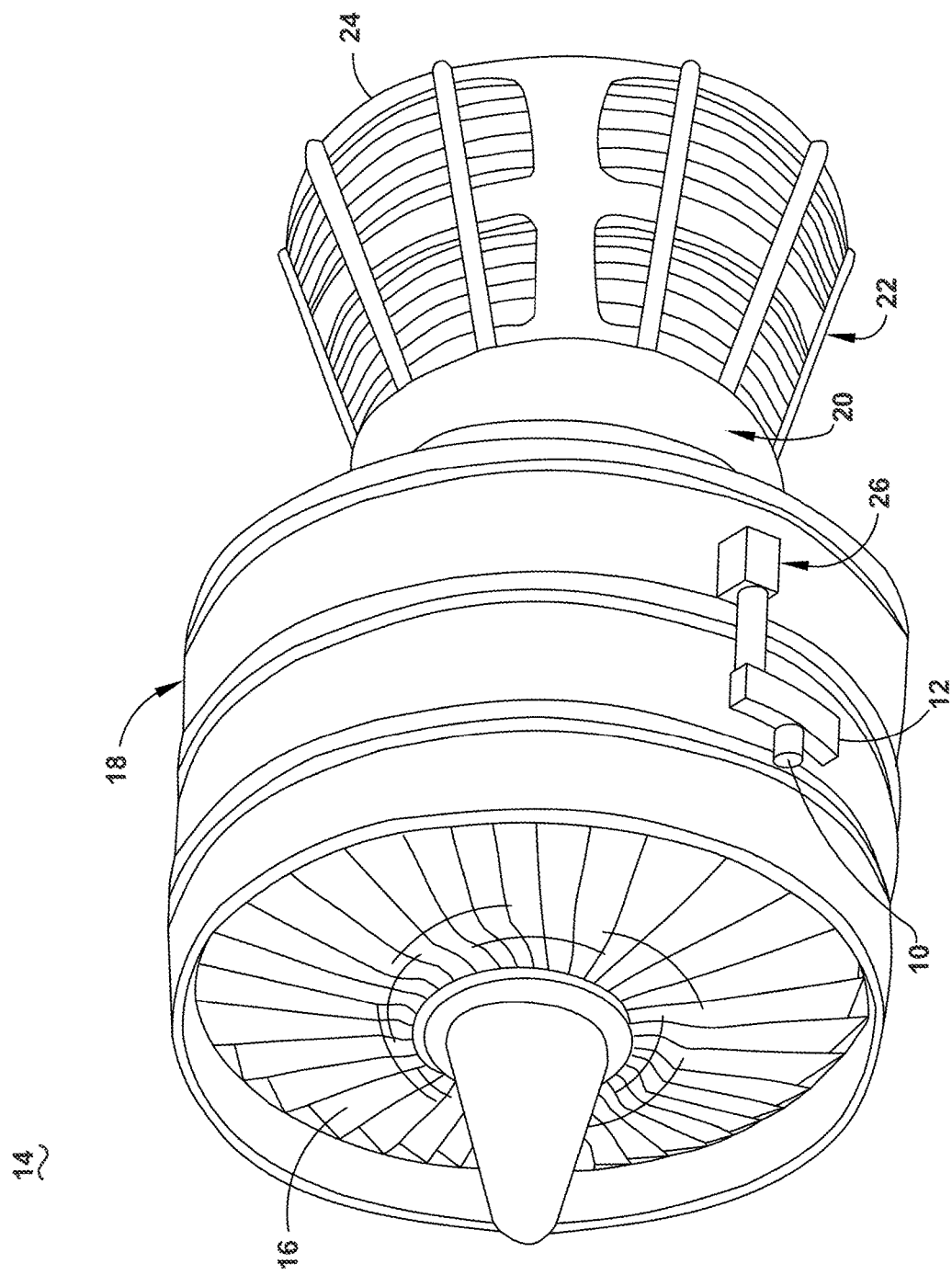
FIG. 1 is a schematic illustration of a turbine engine with a starter, in accordance with various aspects described herein.

Aspects of the disclosure described herein are directed to a turbine engine with an air turbine starter that includes a first bearing assembly configured to rotatably support a drive shaft or turbine member of the air turbine starter. A lubricant passageway provides lubricant to an outlet adjacent a gear operably coupled to the turbine member for rotation the gear. The gear can direct lubricant towards the first bearing assembly. Alternatively, a passageway can provide lubrication to a hollow stationary structure that includes at least one member can lift or direct lubricant toward the first bearing assembly. For purposes of illustration, the present disclosure will be described with respect to an air turbine starter for an aircraft turbine engine. For example, the disclosure can have applicability in other vehicles or engines, and can be used to provide benefits in industrial, commercial, and residential applications as further described in FIG. 8.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "radial" or "radially" refer to a direction away from a common center. For example, in the overall context of a turbine engine, radial refers to a direction along a ray extending between a center longitudinal axis of the engine and an outer engine circumference. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, secured, fastened, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Referring to FIG. 1, an air turbine starter motor or air turbine starter 10 is coupled to an accessory gear box (AGB) 12, also known as a transmission housing, and together are schematically illustrated as being mounted to a turbine engine 14 such as a gas turbine engine. This assembly is commonly referred to as an Integrated Starter/Generator Gearbox (ISGB). The turbine engine 14 comprises an air intake with a fan 16 that supplies air to a high-pressure compression region 18. The air intake with a fan 16 and the high-pressure compression region collectively are known as the 'cold section' of the turbine engine 14 upstream of the combustion. The high-pressure compression region 18 provides a combustion chamber 20 with high pressure air. In the combustion chamber, the high-pressure air is mixed with fuel and combusted. The hot and pressurized combusted gas passes through a high-pressure turbine region 22 and a low-pressure turbine region 24 before exhausting from the turbine engine 14. As the pressurized gases pass through the high-pressure turbine (not shown) of the high-pressure turbine region 22 and the low-pressure turbine (not shown) of the low-pressure turbine region 24, the turbines extract rotational energy from the flow of the gases passing through the turbine engine 14. The high-pressure turbine of the high-pressure turbine region 22 can be coupled to the compression mechanism (not shown) of the high-pressure compression region 18 by way of a shaft to power the compression mechanism. The low-pressure turbine can be coupled to the fan 16 of the air intake by way of a shaft to power the fan 16.

The AGB 12 is coupled to the turbine engine 14 at either the high pressure or low-pressure turbine region 22, 24 by way of a mechanical power take-off 26. The mechanical power take-off 26 contains multiple gears and means for mechanical coupling of the AGB 12 to the turbine engine 14. Under normal operating conditions, the mechanical power take-off 26 translates power from the turbine engine 14 to the AGB 12 to power accessories of the aircraft for example but not limited to fuel pumps, electrical systems, and cabin environment controls. The air turbine starter 10 can be mounted on the outside of either the air intake region containing the fan 16 or on the core near the high-pressure compression region 18.

Figure 2:
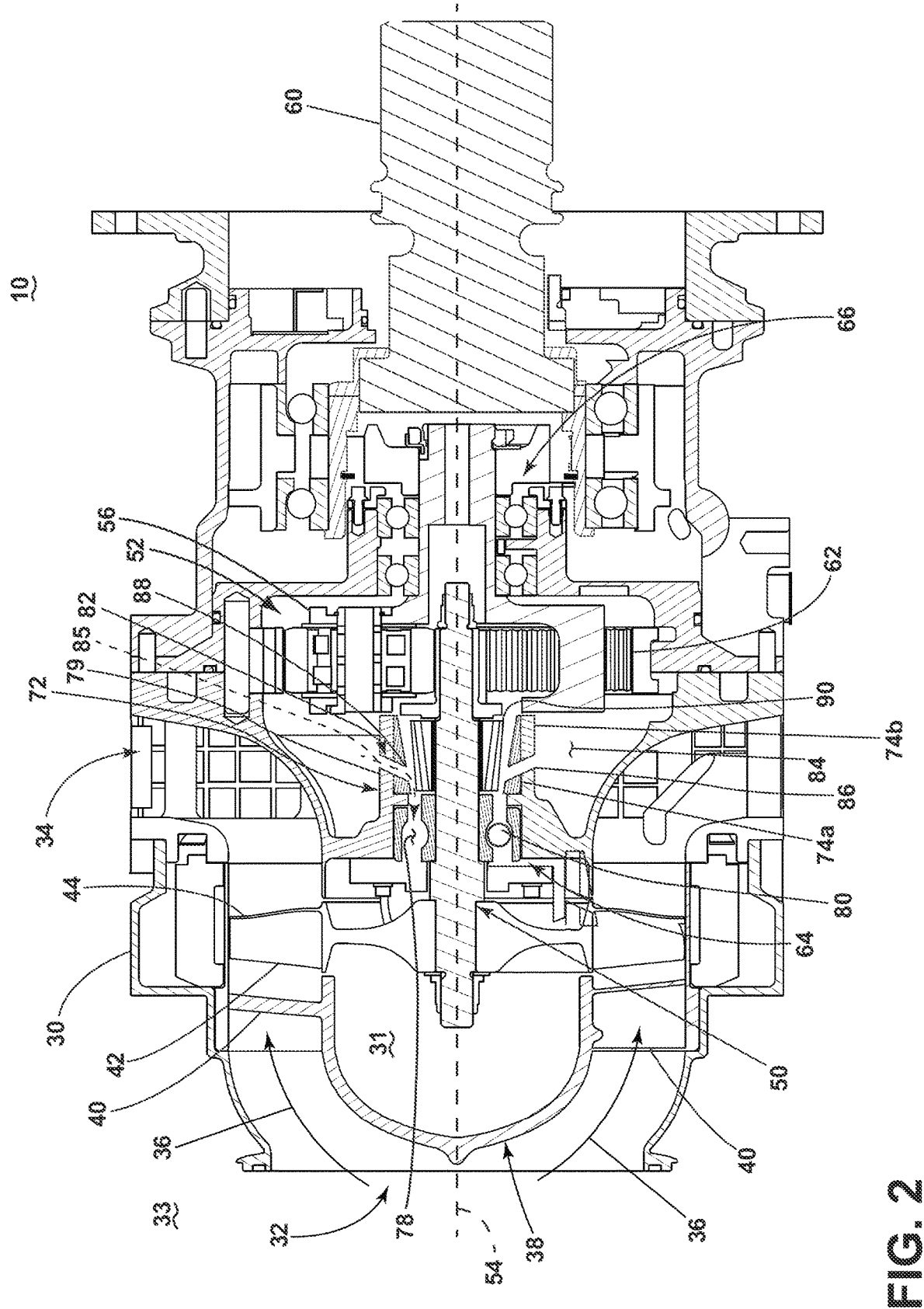
FIG. 2 is a schematic cross-sectional view of a portion of an exemplary starter that can be included in FIG. 1, in accordance with various aspects described herein.

FIG. 2 is a schematic cross section of an exemplary air turbine starter 10 that can be included in FIG. 1. Generally, the air turbine starter 10 includes a housing 30 defining an interior 31 and an exterior 33 of the housing 30. An inlet 32 and an outlet 34 can also be defined by the housing 30. A flow path 36 through the interior 31 is illustrated schematically with arrows. The flow path 36 extends between the inlet 32 and the outlet 34 for communicating a flow of fluid, including, but not limited to gas, compressed air, or the like, there through. In one non-limiting example, the fluid is air, such as pressurized air, that is supplied from a pressurized air source, including but not limited to, a ground-operating air cart, an auxiliary power unit, or a cross-bleed start from an engine already operating.

The housing 30 can be formed in any suitable manner including, but not limited to, that it can be made up of two or more parts that are joined or otherwise coupled together or can be integrally formed as a single piece. A stator 38 can be included in the flow path 36. The stator 38 can couple to or be formed as part of the housing 30 and include permeable portions 40. The permeable portions 40 allow air in the flow path 36 to pass from the inlet 32, through the stator 38 and to a turbine member 42.

The turbine member 42 can be journaled within the interior 31 of the housing 30. The turbine member 42 can be disposed within the flow path 36 for rotatably extracting mechanical power from the flow of gas along the flow path 36. The turbine member 42 can include a rotor portion 44.

A drive shaft 50 is coupled to the rotating turbine member 42 so that the drive shaft 50 can provide a rotational output. An output gear assembly 52 coupled to the drive shaft 50 allows for the transfer of mechanical power from the turbine member 42 to the output gear assembly 52 via the rotational output of the drive shaft 50. The turbine member 42, the drive shaft 50, or a portion of the output gear assembly 52 can rotate about an axis of rotation 54.

The output gear assembly 52 can be or include a gear train 56. An output shaft 60 can be operably coupled to the turbine member 42 via the gear assembly 52 including the gear train 56. It is contemplated that the output gear assembly 52 can include an output gear 62.

A first bearing assembly 64 rotatably supports the drive shaft 50. Optionally, a second bearing assembly 66 can rotatably support the drive shaft 50 or the output shaft 60. The second bearing assembly 66 can be located downstream of the first bearing assembly 64. By way of non-limiting example, the second bearing assembly 66 can be provided adjacent the gear train 56 or the gear assembly 52.

A stationary member 72 including a body 74 can be included within an interior formed by the housing 30. The stationary member 72 can be formed with or coupled to the housing 30, or the stator 38, or any other suitable portion of the air turbine starter 10. In the illustrated example, the stationary member 72 is illustrated as having a separate body 74a as well as the portion 74b. However, it will be understood that only a single unitary body can be utilized or the portion 74b could be utilized alone.

It is contemplated that at least a portion of the stationary member 72 can form, by way of non-limiting example, a portion of a bearing housing of the first bearing assembly 64. A bearing cavity 78 can be formed or defined by at least a portion of the body 74 and receive the first bearing assembly 64 therein. In this manner, the first bearing assembly 64 is located radially between a portion of the stationary member 72 and the drive shaft 50. At least one bearing 80, included in the first bearing assembly 64, can be located in the bearing cavity 78.

A passage or lubricant passageway 82 can extend or traverse from an exterior 84 of the body 74 of the stationary structure or stationary member 72 to the bearing cavity 78. In this manner, the lubricant passageway 82 extends, at least in part, in the radial direction. It is contemplated that the lubricant passageway 82 extends in the inward radial direction as illustrated by lubricant flow arrow 85. The lubricant passageway 82 can couple an oil inlet 86, provided at the exterior 84 of the body 74, to an oil outlet 88, provided at the bearing cavity 78. The inlet 86 can have a radial distance measured from the axis of rotation 54 that is greater than the radial distance measured from the axis of rotation to the outlet 88. The inlet 86 of the lubricant passageway 82 can couple to a conduit or be open to a chamber or cavity at the exterior 84 of the body 74 so that lubricant is received at the inlet 86. For example, splash oil can be received on an upper exterior portion 79 of the stationary member 72 to form the lubricant received at the inlet 86.

A gear 90 can be axially located between the first bearing assembly 64 and the gear assembly 52. The gear 90 is radially located between the drive shaft 50 and the stationary member 72 and located adjacent to the outlet 88 of the lubricant passageway 82. The gear 90 is positioned and configured to direct lubricant from the outlet 88 towards the first bearing assembly 64.

The gear 90 operably couples to the drive shaft 50. The gear 90 can be driven by the drive shaft 50 and rotate with the drive shaft 50 about the axis of rotation 54. No portion of the gear 90 operably couples to another gear. That is, the gear 90 is separate, spaced, or otherwise operably independent of the gear train 56 and the gear assembly 52.

Figure 3:
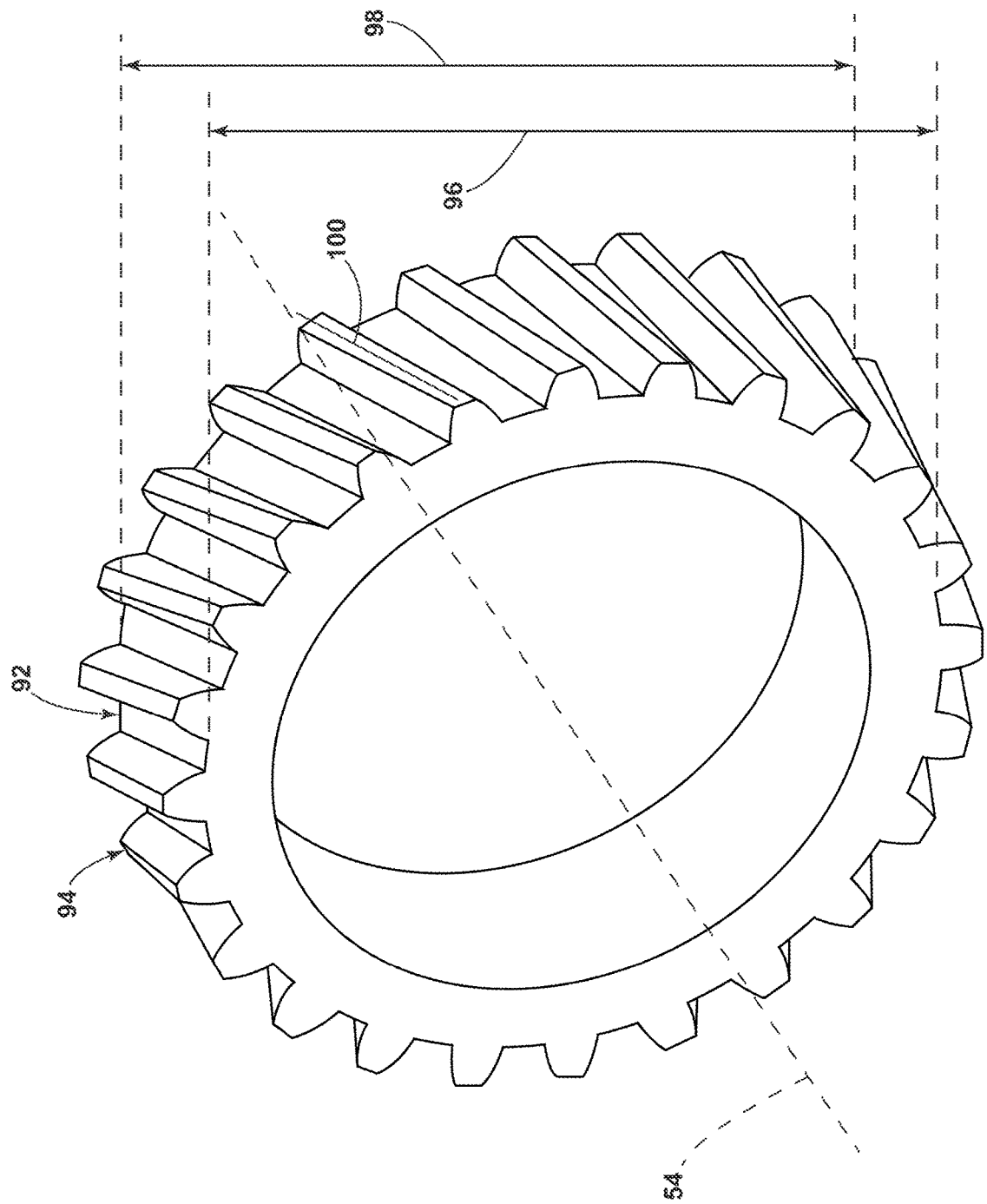
FIG. 3 is a perspective view of a gear of the starter of FIG. 2, in accordance with various aspects described herein.

The gear 90, by way of non-limiting example, can be a bevel gear. FIG. 3 illustrates an example of the gear 90 having a gear body 92 and a plurality of helical teeth 94 that protrude from the gear body 92. The gear body 92 and the plurality of helical teeth 94 can be unitarily formed. The plurality of helical teeth 94 can be inclined at an angle with respect to the axis of rotation 54. One non-limiting example of inclination with respect to the axis of rotation 54 can be a radial inclination. That is, the plurality of helical teeth 94 are at a radial angle greater than zero with respect to the axis of rotation 54. This can be illustrated by measuring an upstream outer diameter 96 and a downstream outer diameter 98 of the gear body 92. If the first bearing assembly 64 is upstream of the gear 90, as illustrated, the upstream outer diameter 96 is less than the downstream outer diameter 98. However, it is contemplated that based on the location of the first bearing assembly 64 relative to the gear 90, that the upstream outer diameter 96 can be greater than or equal to the downstream outer diameter 98.

Another non-limiting example of inclination with respect to the axis of rotation 54 is an axial inclination. That is, a peak line 100 of at least one of the plurality of helical teeth 94 is not parallel in an axial direction to the axis of rotation 54. The peak line 100 can be drawn axially across the entirety of each helical tooth 94 at a point that radially protrudes the greatest distance from the gear body 92.

In operation, and referring back to FIGS. 2 and 3, compressed air is provided at the inlet 32 of the air turbine starter 10. The compressed air is directed by the stator 38 through the flow path 36. The turbine member 42 in the flow path 36 rotates in response to the compressed air flow. The turbine member 42 is operably coupled to the drive shaft 50, which provides rotational output that will result in starting the turbine engine 14.

Lubricant via normal operation of the air turbine starter 10 is delivered, splashed, or otherwise transferred to the inlet 86 of the lubricant passageway 82. The lubricant flows through the lubricant passageway 82 to the outlet 88. The gear 90, located adjacent to the outlet 88, receives the lubrication which flows or splashes against the gear body 92. In the illustrated example, the plurality of helical teeth 94 are inclined away from the first bearing assembly 64 such that lubricant travels downwards towards the first bearing assembly 64. The drive shaft 50 rotates the gear 90. As the drive shaft 50 rotates, the gear 90 reaches a position in which the lubricant flows from between the plurality of helical teeth 94 towards the first bearing assembly 64. The lubricant delivered to the first bearing assembly 64 can cool and lubricate the first bearing assembly 64.

Figure 4:
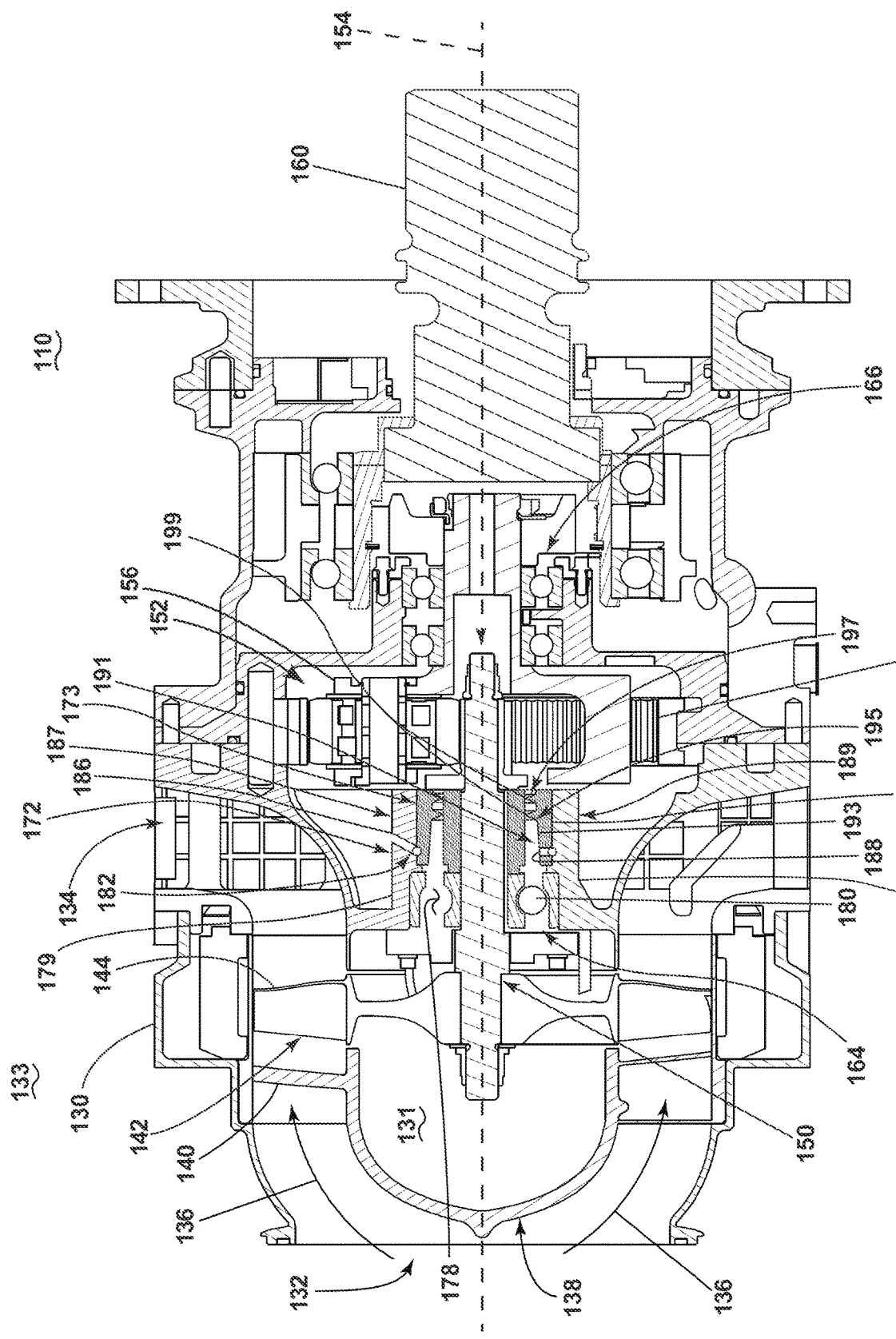
FIG. 4 is a schematic cross-sectional view of a portion of an exemplary starter that can be included in FIG. 1, in accordance with various aspects described herein.

FIG. 4 is another example of a schematic cross section of an air turbine starter 110 that can be used with the turbine engine 14. The air turbine starter 110 is similar to the air turbine starter 10, therefore, like parts will be identified with like numerals increased by 100, with it being understood that the description of the like parts of the air turbine starter 10 applies to the air turbine starter 110, unless otherwise noted.

Generally, the air turbine starter 110 includes a housing 130 defining an interior 131 and an exterior 133 of the housing 130. An inlet 132 and an outlet 134 can also be defined by the housing 130. The flow path 136 through the interior 131 is illustrated schematically with arrows. The flow path 136 extends between the inlet 132 and the outlet 134 for communicating a flow of fluid, including, but not limited to gas, compressed air, or the like, there through. A stator 138 can be included in the flow path 136. The stator 138 can couple to or be formed as part of the housing 130 and include permeable portions 140. The permeable portions 140 allow air in the flow path 136 to pass from the inlet 132, through the stator 138 and to a turbine member 142.

The turbine member 142 can be journaled within the interior 131 of the housing 130. The turbine member 142 can be disposed within the flow path 136 for rotatably extracting mechanical power from the flow of gas along the flow path 136. The turbine member 142 can include a rotor portion 144.

A drive shaft 150 is coupled to the rotating turbine member 142 so that the drive shaft 150 can provide a rotational output. A gear assembly 152 coupled to the drive shaft 150 allows for the transfer of mechanical power from the turbine member 142 to the gear assembly 152 via the rotational output of the drive shaft 150. The turbine member 142, the drive shaft 150, or a portion of the gear assembly 152 can rotate about an axis of rotation 154.

The gear assembly 152 can be or include a gear train 156. An output shaft 160 can be operably coupled to the turbine member 142 via the gear assembly 152 or the gear train 156. It is contemplated that the gear assembly 152 or the gear train 156 can include an output gear 162.

A first bearing assembly 164 rotatably supports the drive shaft 150. Optionally, a second bearing assembly 166 can rotatably support the drive shaft 150 or the output shaft 160. The second bearing assembly 166 can be located downstream of the first bearing assembly 164. By way of non-limiting example, the second bearing assembly 166 can be included in the gear train 156 or the gear assembly 152.

A hollow stationary structure or hollow stationary member 172 can be formed with or coupled to the housing 130 or the stator 138. The first bearing assembly 164 is located radially between a portion of the hollow stationary member 172 and the drive shaft 150. It is contemplated that at least a portion of the hollow stationary member 172 can be, by way of non-limiting example, a portion of a bearing housing.

The hollow stationary member 172 includes a body 174b that at least in part defines a bearing cavity 178. The bearing cavity 178 include the first bearing assembly 164. At least one bearing 180 can be located in the bearing cavity 178. While illustrated as a separate piece, the body 174b can be unitarily formed with the hollow stationary member 172.

A passage or passageway 182 can extend through extending through at least a portion of the hollow stationary member 172. An oil inlet 186 for splash oil can be defined at an upper portion 187 of the hollow stationary member 172. An oil outlet 188 of the passageway 182 can be defined by at a lower portion 189 of the hollow stationary member 172. The passageway 182 can extend circumferentially through at least a portion of the hollow stationary member 172 from the inlet 186 to the outlet 188. While this is not shown in its entirety, the passageway 182 essentially extends into the page of FIG. 4 at the inlet 186 and returns towards the reader at the outlet 188. That is, the passageway 182 at least partially circumscribes the drive shaft 150 so that lubricant flows in a circumferential direction about the axis of rotation 154 through the passageway 182 from the inlet 186 to the outlet 188.

A basin 191 can fluidly connect with the outlet 188. The basin 191 can, at least in part, be defined by the lower portion 189 of the hollow stationary member 172. The basin 191 can be adjacent to or otherwise fluidly connected to the bearing cavity 178. The basin 191 can also be formed by at least one member located within the bearing cavity 178 and configured to direct lubricant in the basin 191 towards the first bearing assembly 164. For example, a first part 201 can be radially received adjacent the hollow stationary member 172. At a lower end the first part 201 includes a lower surface 193 forming a portion of the basin 191. The lower surface 193 declines towards the first bearing assembly 164, forming the at least one member configured to direct lubricant in the basin 191 to the first bearing assembly 164. Alternatively, it is contemplated that the bearing cavity 178 itself can be shaped to form such a sloping basin.

Additionally, or alternatively, at least one seal 197 can extend from the first part 201. The at least one seal 197 can be located at a first end 195 of the basin 191. The at least one seal 197 can be axially located between the bearing cavity 178 and the gear assembly 152 or gear train 156. A labyrinth seal having a set of projections 199 can, at least in part, define the at one seal 197.

It is contemplated that the hollow stationary member 172 can include one or more inner radial components, such as but not limited to inner radial component 173 that can be coupled to or formed with the hollow stationary member 172. The inner radial component 173 can in part define the passageway 182, the inlet 186, the outlet 188, the basin 191, or the at least one seal 197.

In operation, the passageway 182 is fluidly coupled to receive splash oil on an upper exterior portion 179 of the hollow stationary member 172. That is, lubricant is delivered, splashed, or otherwise transferred to the inlet 186 of the passageway 182. The lubricant flows from the inlet 186, through the passageway 182, and exits through the outlet 188. The lubricant can then flow or accumulate in the basin 191 in the lower portion 189 of the hollow stationary member 172. The basin 191 includes the lower surface 193 slanted or angled so that the lubricant is directed into the first bearing assembly 164. The seal 197, that can be a labyrinth seal, can includes a set of projections 199 to further discourage the lubricant from leaving the basin 191 from the rear and thus encourage the lubricant to enter the first bearing assembly 164. The lubricant delivered to the first bearing assembly 164 can cool and lubricate the first bearing assembly 164, allowing the drive shaft 150 to provide rotational output that will result in starting the turbine engine 14.

Figure 5:
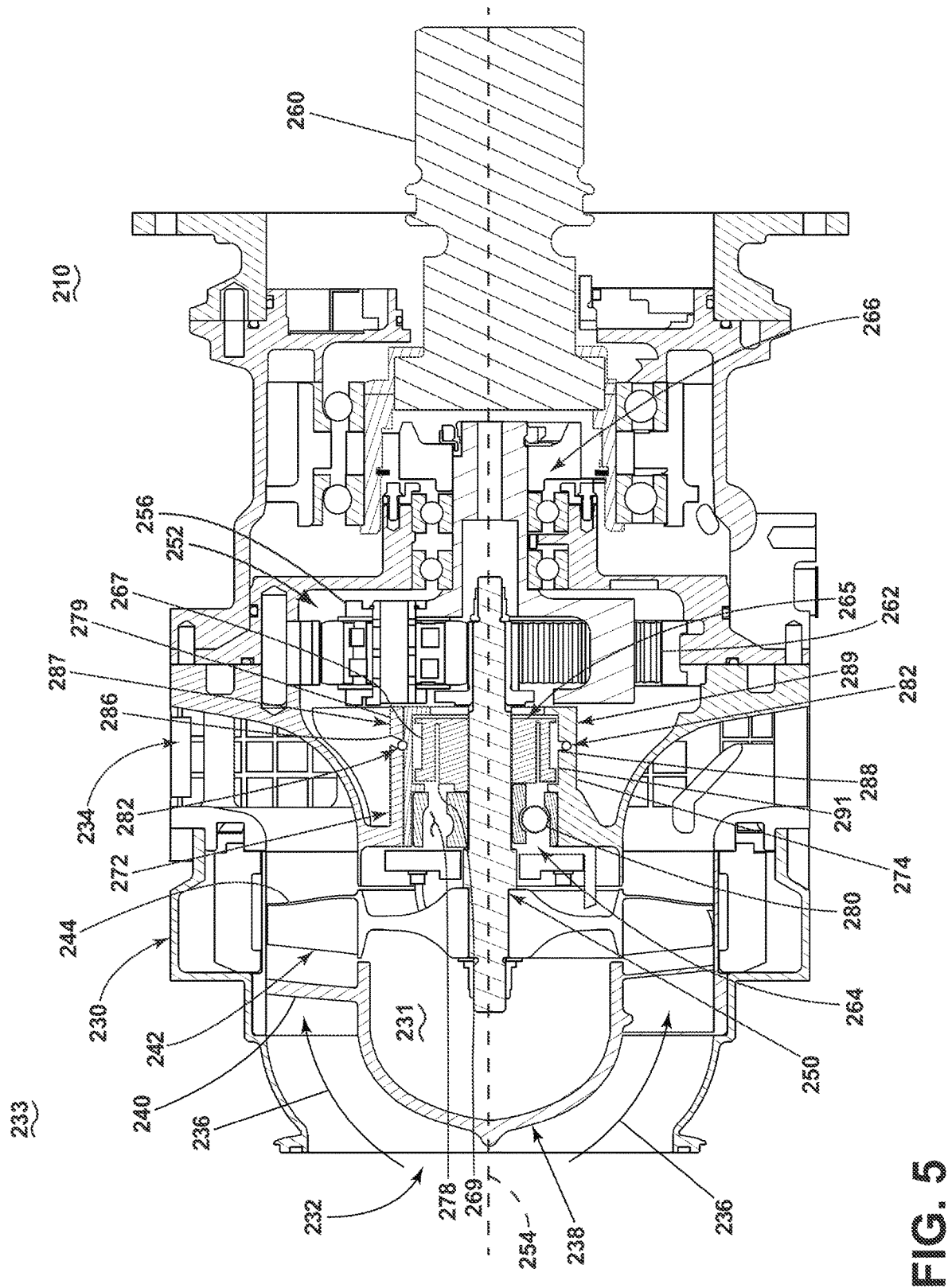
FIG. 5 is a schematic cross-sectional view of a portion of an exemplary starter that can be included in FIG. 1, in accordance with various aspects described herein.

FIG. 5 is yet another example of a schematic cross section of an air turbine starter 210 that can be used with the turbine engine 14. The air turbine starter 210 is similar to the air turbine starter 10, 110 therefore, like parts will be identified with like numerals further increased by 100, with it being understood that the description of the like parts of the air turbine starter 10, 110 applies to the air turbine starter 210, unless otherwise noted.

Generally, the air turbine starter 210 includes a housing 230 defining an interior 231 and an exterior 233 of the housing 230. An inlet 232 and an outlet 234 can also be defined by the housing 230. A flow path 236 through the interior 231 is illustrated schematically with arrows. The flow path 236 extends between the inlet 232 and the outlet 234 for communicating a flow of fluid, including, but not limited to gas, compressed air, or the like, there through. In one non-limiting example, the fluid is air, such as pressurized air, that is supplied from a pressurized air source, including but not limited to, a ground-operating air cart, an auxiliary power unit, or a cross-bleed start from an engine already operating.

The housing 230 can be formed in any suitable manner including, but not limited to, that it can be made up of two or more parts that are joined or otherwise coupled together or can be integrally formed as a single piece. A stator 238 can be included in the flow path 236. The stator 238 can couple to or be formed as part of the housing 230 and include permeable portions 240. The permeable portions 240 allow air in the flow path 236 to pass from the inlet 232, through the stator 238 and to a turbine member 242.

The turbine member 242 can be journaled within the interior 231 of the housing 230. The turbine member 242 can be disposed within the flow path 236 for rotatably extracting mechanical power from the flow of gas along the flow path 236. The turbine member 242 can include a rotor portion 244.

A drive shaft 250 is coupled to the rotating turbine member 242 so that the drive shaft 250 can provide a rotational output. A gear assembly 252 coupled to the drive shaft 250 allows for the transfer of mechanical power from the turbine member 242 to the gear assembly 252 via the rotational output of the drive shaft 250. The turbine member 242, the drive shaft 250, or a portion of the gear assembly 252 can rotate about an axis of rotation 254.

The gear assembly 252 can be or include a gear train 256. An output shaft 260 can be operably coupled to the turbine member 242 via the gear assembly 252 or the gear train 256. It is contemplated that the gear assembly 252 or the gear train 256 can include an output gear 262.

A first bearing assembly 264 rotatably supports the drive shaft 250. Optionally, a second bearing assembly 266 can rotatably support the drive shaft 250 or the output shaft 260. The second bearing assembly 266 can be located downstream of the first bearing assembly 264. By way of non-limiting example, the second bearing assembly 266 can be included in the gear train 256 or the gear assembly 252.

A hollow stationary member 272 can be formed with or coupled to the housing 230 or the stator 238. The first bearing assembly 264 is located radially between a portion of the hollow stationary member 272 and the drive shaft 250. It is contemplated that at least a portion of the hollow stationary member 272 can form a portion of a bearing housing.

The hollow stationary member 272 can include a body 274 that is located radially within the hollow stationary member 272 and can, at least in part, define a bearing cavity 278. The bearing cavity 278 include the first bearing assembly 264. At least one bearing 280 can be located in the bearing cavity 278. While illustrated as a separate piece, the body 274 can be unitarily formed with the hollow stationary member 272.

A passage or passageway 282 can extend through extending through at least a portion of the hollow stationary member 272. An oil inlet 286 for splash oil can be defined at an upper portion 287 of the hollow stationary member 272. An oil outlet 288 of the passageway 282 can be defined by at a lower portion 289 of the hollow stationary member 272. The passageway 282 can extend circumferentially through at least a portion of the hollow stationary member 272 from the inlet 286 to the outlet 288.

A basin 291 can fluidly connect with the outlet 288. The basin 291 can, at least in part, be defined by the lower portion 289 of the hollow stationary member 272. The basin 291 can be adjacent to or otherwise fluidly connected to the bearing cavity 278. At least one member is located within the bearing cavity 278 and configured to direct lubricant in the basin 291 towards the first bearing assembly 264. The at least one member can, by way of non-limiting example, be a rotatable member 265.

The rotatable member 265 can be coupled to the drive shaft 250, where the rotatable member 265 and the drive shaft 250 rotate together about the axis of rotation 254. The rotatable member 265 can be a scoop wheel that can lift lubricant from the basin 291 as the rotatable member 265 rotates. At least one vane 267 is located on the scoop wheel or rotatable member 265 to direct fluid to at least one fluid outlet 269 laterally adjacent the at least one vane 267.

FIG. 5 further illustrates the rotatable member 265 or scoop wheel having vanes 267. Lubricant flow arrow 285 illustrates the flow of lubricant into the rotatable member 265 and exiting via the at least one fluid outlet 269 as guided by the at least one vane 267 during rotational movement of the rotatable member 265. Rear wall 271 seals the downstream side of the rotatable member 265, ensuring the exit of the lubricant through the at least one fluid outlet 269 that is fluidly connected to the bearing cavity 278.

Figure 6:
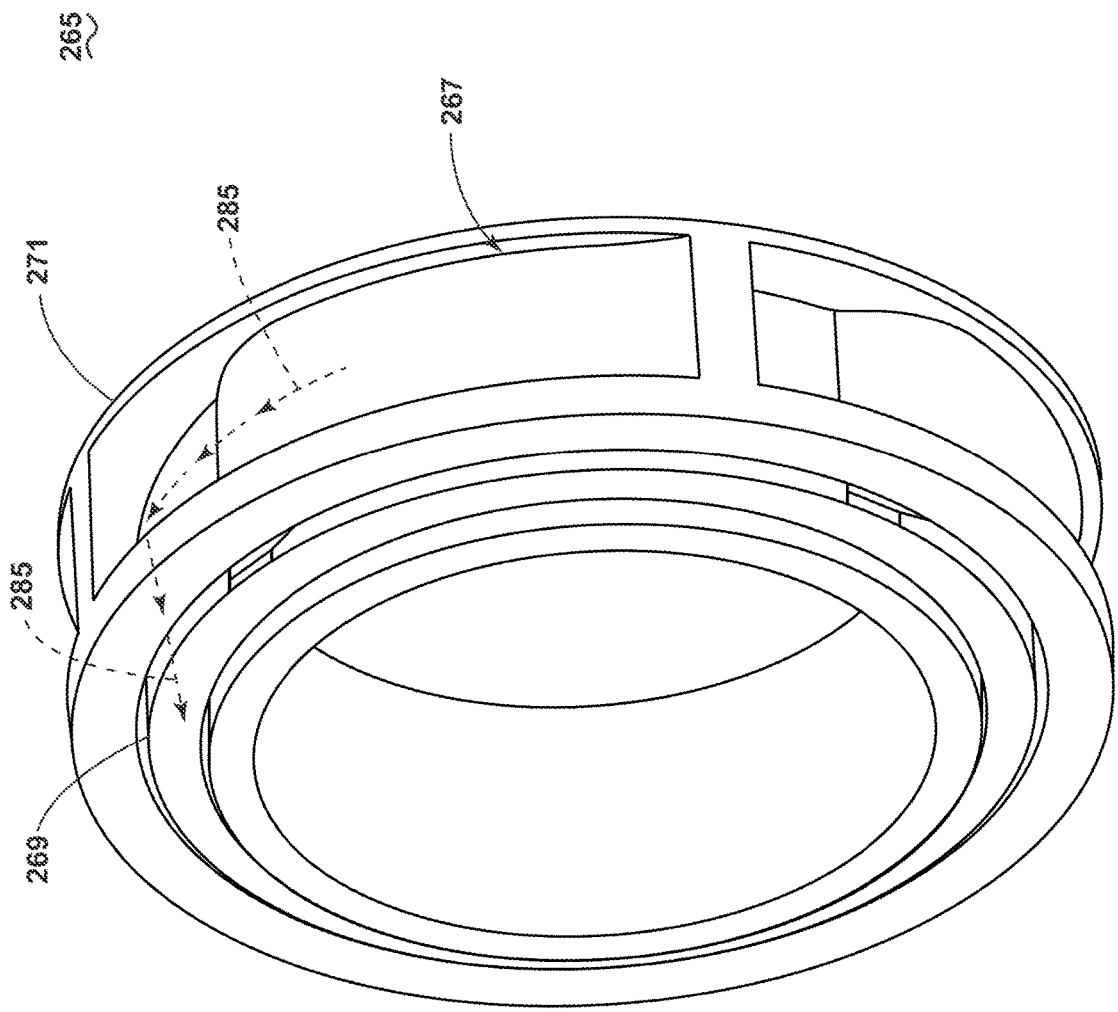
FIG. 6 is a perspective view of a wheel of the starter of FIG. 5, in accordance with various aspects described herein.

FIG. 6 is a cross section of the rotatable member 265 further illustrating the scoops or vanes 267. The at least one vane 267 can include a scooping portion 273 that directs fluid from the basin 291 into the rotatable member 265. A guiding portion 275 of the at least one vane 267 directs fluid as the rotatable member 265 rotates. The guiding portion 275 can define at least one void 277 capable of receiving fluid. The scooping portion 275 directs the fluid from the at least one void 277 to the bearing cavity 278 via the at least one fluid outlet 269. While illustrated as having four vanes 267, it is contemplated that any number of vanes or other methods of scooping fluid can be used in the rotatable member 265.

In operation, compressed air is provided at the inlet 232 of the air turbine starter 210. The compressed air is directed by the stator 238 through the flow path 236. The turbine member 242 in the flow path 236 rotates in response to the compressed air flow. The turbine member 242 is operably coupled to the drive shaft 250.

The passageway 282 is fluidly coupled to receive splash oil on an upper exterior portion 279 of the stationary member 272. That is, lubricant is delivered, splashed, or otherwise transferred to the inlet 286 of the passageway 282. The lubricant flows from the inlet 286 through the passageway 282, exiting at the outlet 288. The lubricant can then flow or accumulate in the basin 291 in the lower portion 289 of the hollow stationary member 272.

Figure 7:
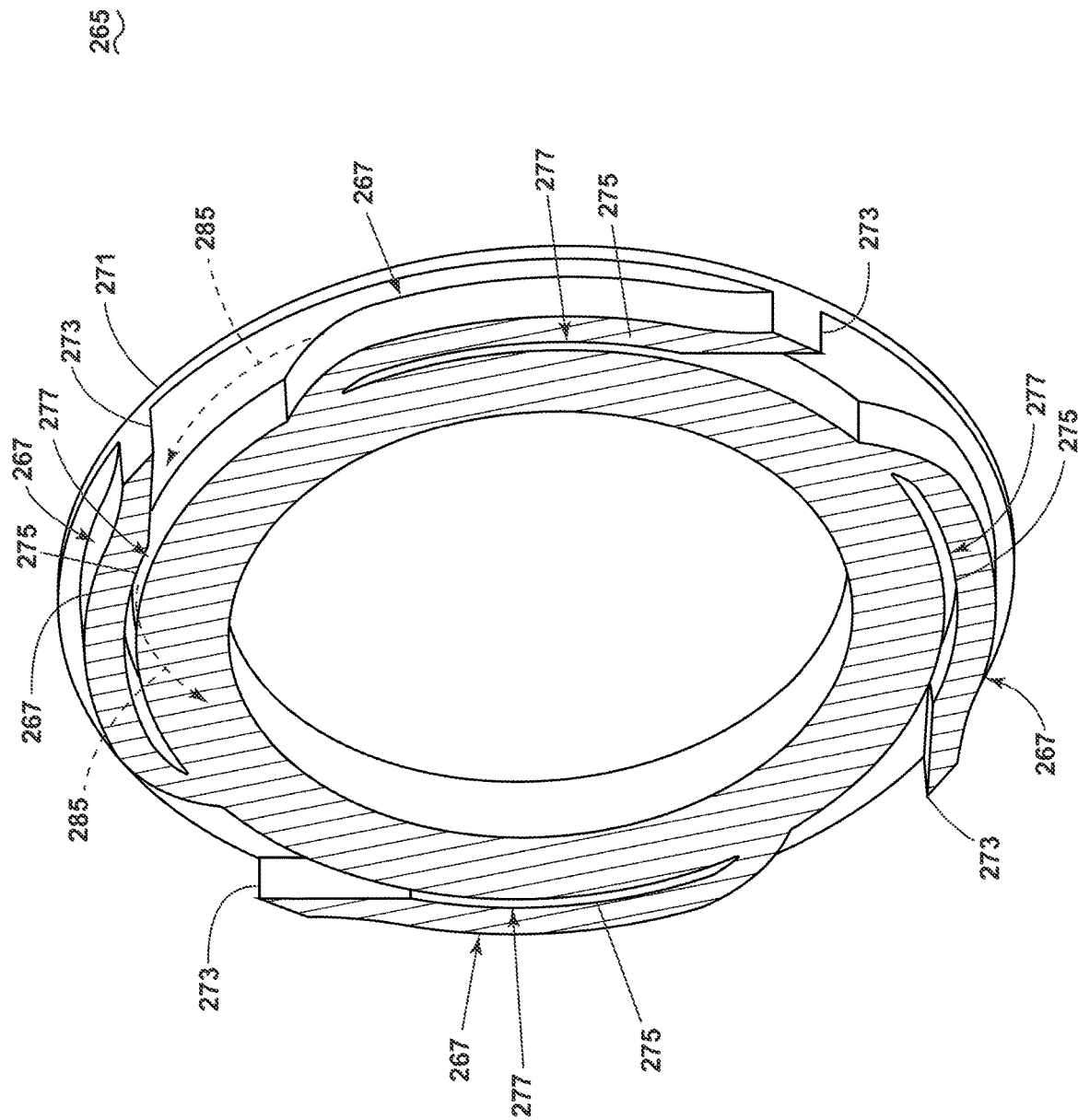
FIG. 7 is a perspective cross-sectional view of the wheel of FIG. 6, in accordance with various aspects described herein.

The lubricant in the basin 291 is scooped or otherwise lifted by the rotatable member 265 that is operably coupled and rotating with the drive shaft 250. The at least one vane 267 includes the scooping portion 273 that directs fluid from the basin 291 into the at least one void 277 of rotatable member 265 defined by the guiding portion 275 (FIG. 7) and the rear wall 271. As the rotatable member 265 rotates, the lubricant is lifted upwards and spills out the at least one fluid outlet 269. Upon exiting the rotatable member 265 at the at least one fluid outlet 269, the lubricant flows into the bearing cavity 278.

The lubricant delivered to the first bearing assembly 264 can cool and lubricate the first bearing assembly 264, allowing the drive shaft 250 to provide rotational output that will result in starting the turbine engine 14.

Many other possible examples and configurations in addition to those shown in the above figures are contemplated by the present disclosure. Additionally, the design and placement of the various components such as the AGB 12 or the air turbine starter 10 or components thereof can be rearranged such that a number of different configurations could be realized.

Figure 8:
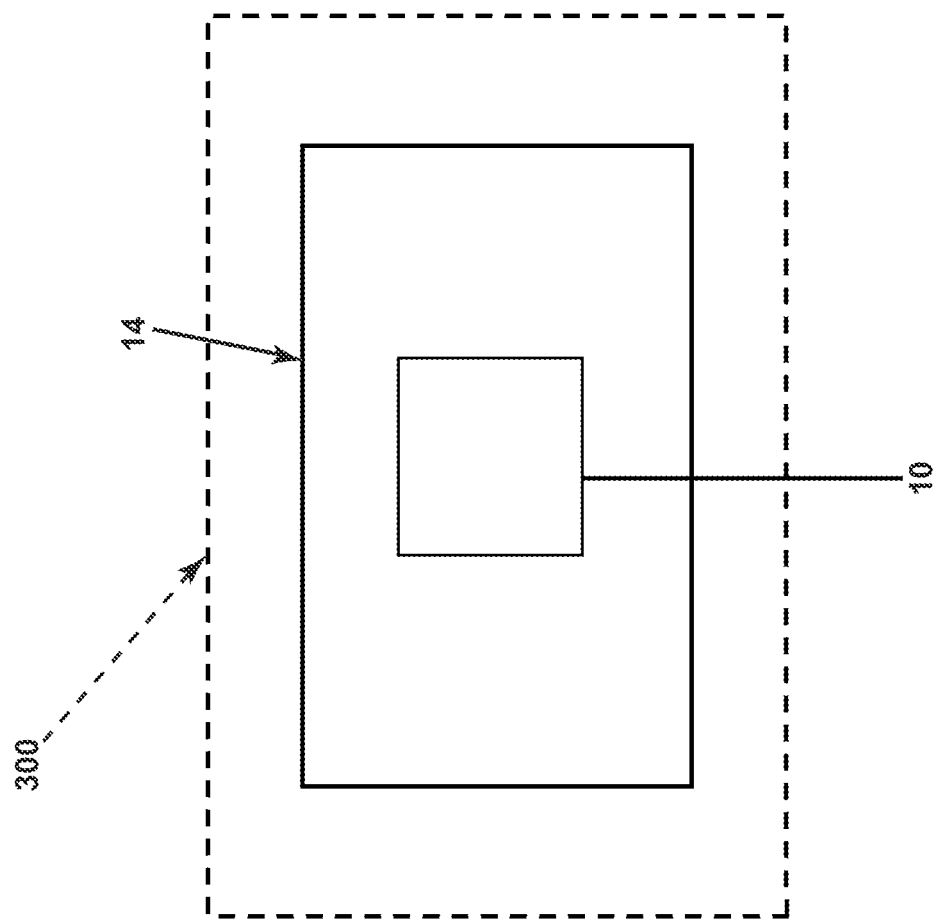
FIG. 8 is a schematic illustration of the turbine engine and starter from FIG. 1 in a vehicle or structure.

FIG. 8 is a schematic illustration of the turbine engine 14 and starter 10 from FIG. 1, where the turbine engine 14 can be in a vehicle or structure 300. The vehicle or structure 300 can be, by way of non-limiting example, a helicopter or other aircraft, a boat or other aquatic vehicle, or a car or other land vehicle. Further, the vehicle or structure 300 can be, but is not limited to, a marine power plant, a wind turbine, or a small power plant. It is further considered that the turbine engine 14 can be any engine using a turbine with the starter/generator 10 required by the vehicle or structure 300.

Benefits associated with aspects of the disclosure herein reduced temperatures in the first bearing assembly can lead to longer part life. Additionally, the reduced running temperature in the first bearing assembly can lead to an overall longer operational time for the air turbine starter.

The reduced temperatures in the first bearing assembly can also allow for a faster rotation of the drive shaft. A faster rotation of the drive shaft increases the power output from the air turbine starter. This will allow smaller air turbine starters to provide the power needed to start a larger variety of turbine engines.

The reduced temperatures in the first bearing assembly can also allow for a longer run time of the air turbine starter. A longer run time allows the turbine engine to attempt to start using the air turbine starter more than once before a cool-down cycle is performed.

Further aspects of the invention are provided by the subject matter of the following clauses:

1. An air turbine starter that includes a housing defining an exterior, an interior, an inlet, an outlet, and a flow path extending through the interior between the inlet and the outlet, a turbine member having a rotor portion journaled within the interior of the housing and disposed within the flow path, a drive shaft operably coupled with the turbine member, a stationary member having a body forming a bearing cavity, a first bearing assembly configured to rotatably support the drive shaft or turbine member, a lubricant passageway traversing from an exterior of the body of the stationary structure to the bearing cavity, and a gear located adjacent an outlet of the lubricant passageway and operably coupled to the turbine member for rotation therewith, the gear configured to direct lubricant towards the first bearing assembly.

2. The air turbine starter of clause 1 wherein the lubricant passageway extends, at least in part, in a radial direction.

3. The air turbine starter of any preceding clause, further comprising a gear assembly operably coupling the turbine member and the drive shaft and separate from the gear located adjacent the outlet.

4. The air turbine starter of any preceding clause wherein the gear assembly is a gear train including an output gear providing a driving force to an output shaft.

5. The air turbine starter of any preceding clause wherein the gear includes a plurality of helical teeth that are not operably coupled to another gear.

6. The air turbine starter of any preceding clause wherein the gear rotates about an axis of rotation and the plurality of helical teeth are inclined at an angle with respect to the axis of rotation.

7. The air turbine starter of any preceding clause wherein the gear comprises a bevel gear mounted to the drive shaft.

8. The air turbine starter of any preceding clause, further comprising a second bearing assembly configured to rotatably support the drive shaft downstream of the first bearing assembly.

9. The air turbine assembly of any preceding clause wherein the lubricant passageway is fluidly coupled to receive splash oil on an upper exterior portion of the stationary member.

10. An air turbine starter, including a housing defining an interior, a turbine member having a rotor portion journaled within the interior of the housing, a drive shaft operably coupled with the turbine member, a hollow stationary structure located within the housing and having a body defining a bearing cavity, a passage extending through at least a portion of the hollow stationary structure, the passage having an inlet for splash oil in at least an upper portion of the hollow stationary structure and a basin defined at a lower portion of the hollow stationary structure and wherein the basin is fluidly coupled to the bearing cavity, a first bearing assembly located within the bearing cavity, the first bearing assembly configured to rotatably support the drive shaft, and at least one member located within the bearing cavity and configured to direct lubricant in the basin towards the first bearing assembly.

11. The air turbine starter of any preceding clause wherein the passage extends circumferentially from the inlet located at an upper portion of the hollow stationary structure to an outlet located at the lower portion of the hollow stationary structure and wherein the outlet is fluidly coupled to the basin.

12. The air turbine starter of any preceding clause, further comprising a seal at a first end of the basin, the seal located between the hollow stationary structure and the drive shaft.

13. The air turbine starter of any preceding clause wherein the seal is a labyrinth seal having a set of projections.

14. The air turbine starter of any preceding clause wherein a surface of the seal is declined towards the first bearing assembly and forms the at least one member.

15. The air turbine starter of any preceding clause wherein the at least one member comprises a rotatable member located within the bearing cavity at least a portion of which is radially external of the first bearing assembly and wherein the rotatable member is configured to lift lubricant from the basin.

16. The air turbine starter of any preceding clause wherein the rotatable member is a scoop wheel having a set of vanes.

17. The air turbine starter of any preceding clause wherein the scoop wheel further comprises at least one fluid outlet laterally adjacent the set of vanes.

18. The air turbine housing of any preceding clause wherein the fluid outlet is fluidly coupled to a void formed in the scoop wheel via the vane.

19. The air turbine assembly of any preceding clause wherein the lubricant passageway is fluidly coupled to receive splash oil on an upper exterior portion of the stationary member to form the lubricant.

20. The air turbine starter of any preceding clause, further comprising a second bearing assembly configured to rotatably support the drive shaft downstream of the first bearing assembly.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An air turbine starter, comprising:
a housing defining an exterior and an interior;
a turbine member located within the interior of the housing;
a drive shaft operably coupled with the turbine member;
a first bearing assembly configured to rotatably support the drive shaft or turbine member; and
a gear in contact with the drive shaft or axially located along the drive shaft, the gear configured to receive lubricant and direct the lubricant towards the first bearing assembly.

2. The air turbine starter of claim 1, further comprising a gear assembly operably coupling the turbine member and the drive shaft and separate from the gear coupled to the drive shaft.

3. The air turbine starter of claim 2 wherein the gear assembly is a gear train including an output gear providing a driving force to an output shaft.

4. The air turbine starter of claim 2 wherein the gear is axially located between the turbine member and the gear assembly.

5. The air turbine starter of claim 1 wherein the gear includes a plurality of helical teeth that are not operably coupled to another gear.

6. The air turbine starter of claim 1 wherein the gear includes a gear body and a plurality of helical teeth.

7. The air turbine starter of claim 6 wherein the gear body includes an upstream outer diameter and a downstream outer diameter.

8. The air turbine starter of claim 7 wherein the upstream outer diameter is less than the downstream outer diameter when the first bearing assembly is upstream of the gear.

9. The air turbine starter of claim 7 wherein the upstream outer diameter is greater than the downstream outer diameter when the first bearing assembly is downstream of the gear.

10. The air turbine starter of claim 6 wherein each of the plurality of helical teeth include a peak line which extends axially across each of the plurality of helical teeth at a point that radially protrudes the greatest distance from the gear body.

11. The air turbine starter of claim 10 wherein the peak line and an axial direction are at a non-zero angle.

12. The air turbine starter of claim 1 wherein the gear receives the lubricant radially from an outlet and directs the lubricant axially to the first bearing assembly.

13. The air turbine starter of claim 1 wherein the gear axially confronts an opening of the first bearing assembly.

14. The air turbine starter of claim 13 wherein the gear receives the lubricant radially from an outlet and directs the lubricant axially to the first bearing assembly.

15. The air turbine starter of claim 1, further comprising a second bearing assembly configured to rotatably support the drive shaft downstream of the first bearing assembly.

16. A method of supplying lubricant to a first bearing assembly in an air turbine starter, the method comprising:
   flowing compressed air through a flow path defined, in part, by a housing of the air turbine starter;
   rotating a turbine member located in the flow path, wherein the turbine member is operably coupled to a drive shaft;
   rotating a gear in contact with the drive shaft or located axially along the drive shaft;
   providing lubricant to the gear; and
   directing the lubricant from the gear to the first bearing assembly.

17. The method of claim 16 wherein the directing the lubricant further comprises flowing the lubricant between a plurality of helical teeth that extend from a gear body of the gear to the first bearing assembly.

18. The method of claim 16 further comprises flowing the lubricant through a radially extending lubricant passageway to an outlet axially located downstream of the gear.

19. The method of claim 16 wherein the lubricant is radially provided to the gear and axially directed from the gear to the first bearing assembly.

20. An air turbine starter, comprising:
   a housing defining an exterior and an interior;
   a turbine member located within the interior of the housing;
   a drive shaft operably coupled with the turbine member, wherein the drive shaft has a first end and a second end located axially downstream of the first end;
   a first bearing assembly configured to rotatably support the drive shaft or turbine member; and
   a gear located axially between the first end and the second end of the drive shaft, the gear configured to receive lubricant and direct the lubricant towards the first bearing assembly.

* * * * *